United States Patent
Minaki

(10) Patent No.: US 12,536,278 B2
(45) Date of Patent: Jan. 27, 2026

(54) SEMICONDUCTOR DEVICE AND CLOCK CONTROL METHOD

(71) Applicant: RENESAS ELECTRONICS CORPORATION, Tokyo (JP)

(72) Inventor: Takahiro Minaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 575 days.

(21) Appl. No.: 17/958,775

(22) Filed: Oct. 3, 2022

(65) Prior Publication Data

US 2023/0169167 A1 Jun. 1, 2023

(30) Foreign Application Priority Data

Nov. 29, 2021 (JP) ................................ 2021-192640

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | | |
|---|---|---|---|---|
| 7,899,190 B2* | 3/2011 | Gebotys | ................. | H04L 9/0631 380/252 |
| 10,579,791 B2* | 3/2020 | Zhang | ..................... | G06F 21/53 |
| 2001/0053220 A1* | 12/2001 | Kocher | ................... | H04L 9/003 380/29 |
| 2003/0044003 A1* | 3/2003 | Chari | ..................... | G06F 21/556 380/28 |
| 2011/0248762 A1* | 10/2011 | Minaki | ..................... | G06F 1/04 327/293 |
| 2014/0317433 A1* | 10/2014 | Fatemi | .................. | G06F 11/004 713/501 |
| 2015/0312027 A1* | 10/2015 | Kim | ........................ | H04L 9/002 380/28 |
| 2015/0347762 A1* | 12/2015 | Horne | ....................... | G06F 7/58 726/26 |
| 2017/0288855 A1* | 10/2017 | Kumar | .................... | H04L 9/003 |
| 2018/0309566 A1* | 10/2018 | Buch | ................... | G06F 12/0246 |
| 2019/0213330 A1* | 7/2019 | Shen-Orr | ............ | G06F 12/1441 |

FOREIGN PATENT DOCUMENTS

JP 2000-259784 A 9/2000

OTHER PUBLICATIONS

Luo et al., "Comprehensive Side-Channel power Analysis of XTS-AES", Dec. 2019, IEEE, vol. 38, 2191-2200.*

* cited by examiner

*Primary Examiner* — Kambiz Zand
(74) *Attorney, Agent, or Firm* — RIMON P.C.

(57) ABSTRACT

A semiconductor device provides a method to avoid side-channel attacks. While the logic circuit A for performing the encryption process does not operate, by operating the logic circuit B (performing processing other than the encryption) having a circuit scale of approximately the same as the logic circuit A, the change in the consumption current interlocked with the operation state of the logic circuit A is shielded, it is possible to make it difficult to decrypt the encryption key of the logic circuit A by analyzing the current waveform.

12 Claims, 7 Drawing Sheets

SEMICONDUCTOR DEVICE AND CLOCK CONTROL METHOD

CROSS-REFERENCE TO RELATED APPLICATIONS

The disclosure of Japanese Patent Application No. 2021-192640 filed on Nov. 29, 2021 including the specification, drawings and abstract is incorporated herein by reference in its entirety.

BACKGROUND

The present invention relates to a semiconductor device having resistance to side-channel attacks and a clock control method for avoiding side-channel attacks.

System LSI (Large Scale Integration) is an LSI in which one or more functions are integrated in one chip, and it is also called SoC (System on Chip). At present, system LSIs are used in many applications (for example, security applications), and system LSIs have realized various functions. System LSIs for security applications usually include an encryption function as one of the components.

One of the threats to secure LSIs is side-channel attacks. Side-channel attacks are generic names of attacks that attempt to obtain secret information inside encryption circuits by measuring physical quantities such as power consumption, electromagnetic waves, processing time, etc. of encryption circuits and analyzing them. For example, a side-channel attack, called a power analysis attack, acquires secret information by analyzing a slight bias in power consumption depending on the secret For example, Patent Document 1 (FIG. 34) discloses a method of making it difficult to decrypt the encryption key by analysis of the current waveform by changing a current consumption in the time axis. The current consumption is changed by a false current generating circuit that inserts the reactive cycle when viewed in the time axis, or further gives a random fluctuation in the frequency of the clock itself, or further provides a false current generating circuit for generating a current such as an irregular current value. Further, Patent Document 1 discloses that a jitter is generated intentionally in frequency by changing the capacitance of the capacitor for holding the control voltage of VCO (Voltage Controlled Oscillator) based on a random number.

Furthermore, Patent Document 1 (FIG. 28) discloses that the timing is changed by utilizing a random signal generated by the random number generator and the timing generating circuit, and inserting a pseudo process consisting of one or more instructions to the CPU.

Furthermore, Patent Document 1 (FIG. 5), the output signal of the oscillation circuit is counted by a counter, the counting output is sampled by the timing generator output asynchronous with the oscillation frequency, and transferred as data to the register. Capacitances C1 to C4, etc., whose capacitance of the capacitor is changed based on a random number, are connected to each stage of the register. With this configuration, while generating a random number by sampling the counting output of the counter, the combination of the high-level output and the low-level output corresponding to the state of the charge and the random number capacitances C1 to C4 holds, a false current consisting of an enormous combination is described to be generated in synchronization with the clock.

There is disclosed technique listed below.

[Patent Document 1] Japanese Unexamined Patent Application No. 2000-259784

SUMMARY

However, as described in Patent Document 1 (FIG. 34), the method of randomizing the clock oscillation, since the frequency deviates from the median value by the amount of jitter, it is necessary to increase the margin in the timing design, the difficulty of the timing design is increased. Further, as described in Patent Document 1 (FIG. 28), the method of performing the insertion of the dummy process by hardware, for example, it is necessary to correct the state machine of hardware to perform the encryption process or the like, and there is no degree of freedom about the dummy process insertion by software control. Further, adding a false current generating circuit as described in Patent Document 1 (FIG. 5), there is a disadvantage that the total power consumption and chip area is increased.

The present invention, while avoiding disadvantages in the prior art, it is intended to take measures against side-channel attacks.

In the method for avoiding side-channel attack according to an embodiment, by replacing the clock oscillation state with a pseudo-random number, since the processing time is shifted every time, the side-channel attack by simple power analysis becomes difficult. Furthermore, by replacing the clock oscillation state of the logic circuit with the inverted value of the pseudorandom number, it is possible to increase the immunity to the side-channel attack by the power analysis by moving the other logic circuit and smoothing the power while the logic circuit is stopped.

Without increasing the total power consumption and the chip area, and without increasing the design difficulty, it becomes possible to control the change in the current consumption when viewed is the time axis, it is possible to make it difficult to decrypt the encryption key by analyzing the current waveform, etc.

DETAILED DESCRIPTION

Figure 1:
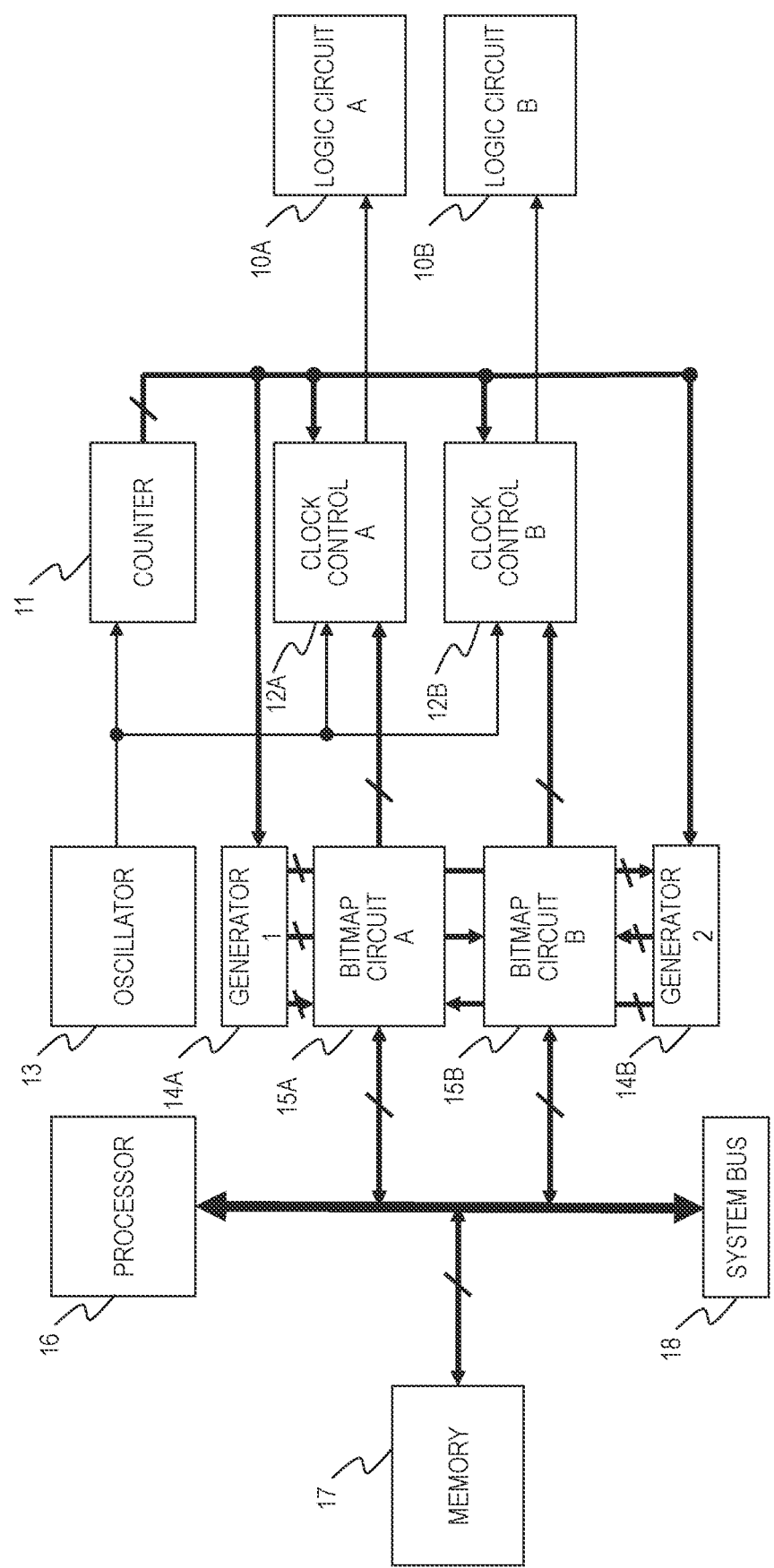
FIG. 1 is a configuration diagram of a semiconductor device according to a first embodiment.

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments and each modification may be arbitrarily combined with each other.

First Embodiment

FIG. 1 is a diagram showing an overall configuration of a semiconductor device according to a first embodiment.

It has a processor, a shared memory, an oscillator circuit, a counter circuit, a random number generator, a bitmap circuit indicating a clock oscillation state, a clock control circuit, and a logic circuit driven by a clock generated by the clock control circuit. Incidentally, the random number generator, the clock control circuit and the logic circuit shall be increased by any number as required.

In FIG. 1, the bitmap circuits A, B (15A, 15B) and the clock control circuits A, B (12A, 12B) and the logic circuit A, B (10A, 10B), the number of random number generator 1, 2 (14A, 14B) is expanded as required. The bitmap circuits A, B (15A, 15B) are composed of rewritable registers and selectors as described below. The counter circuit (11) is used in common. The count value counted by the counter circuit (11) is transmitted to the clock control circuits A, B (12A, 12B) and the random number generators 1, 2 (14A, 14B).

The random number information generated by the random number generators 1, 2 (14A, 14B) is transmitted to the bitmap circuits A, B (15A, 15B). The bitmap information A, B outputted from each of the bitmap circuits A, B (15A, 15B) are transmitted to the clock control circuits A, B (12A, 12B). The intermittent clocks A, B outputted from each of the clock control circuit A, B (12A, 12B) are transmitted to the logic circuit A, B (10A, 10B). The processor (16) sets the oscillation control information required to generate the bitmap information A, B to the bitmap circuits A, B (15A, 15B).

The shared memory (17) stores, for example, an optimum combination of bitmap information for each operation mode. The processor (16), shared memory (17) and bitmap circuits A, B (15A, 15B) are connected to the system bus (18). The processor (16) reads the combination of the optimum oscillation control information from the shared memory (17) according to the operation mode, and sets the bitmap information to the bitmap circuits A, B (15A, 15B) via the system bus (18).

The counter circuit (11) outputs, for example, a count value sequentially incremented between 0 to 15. The random number generators 1, 2 (14A, 14B) in conjunction with the overflow of the count value, for example, to generate a 16-bit random number, and updates. In this embodiment, for example, the logic circuit A (10A) is a circuit for performing processing of encryption and decryption using an encryption key. On the other hand, the logic circuit B (10B) is a circuit that performs processing other than the encryption having a circuit size almost equal to the logic circuit A (10A).

Figure 2:
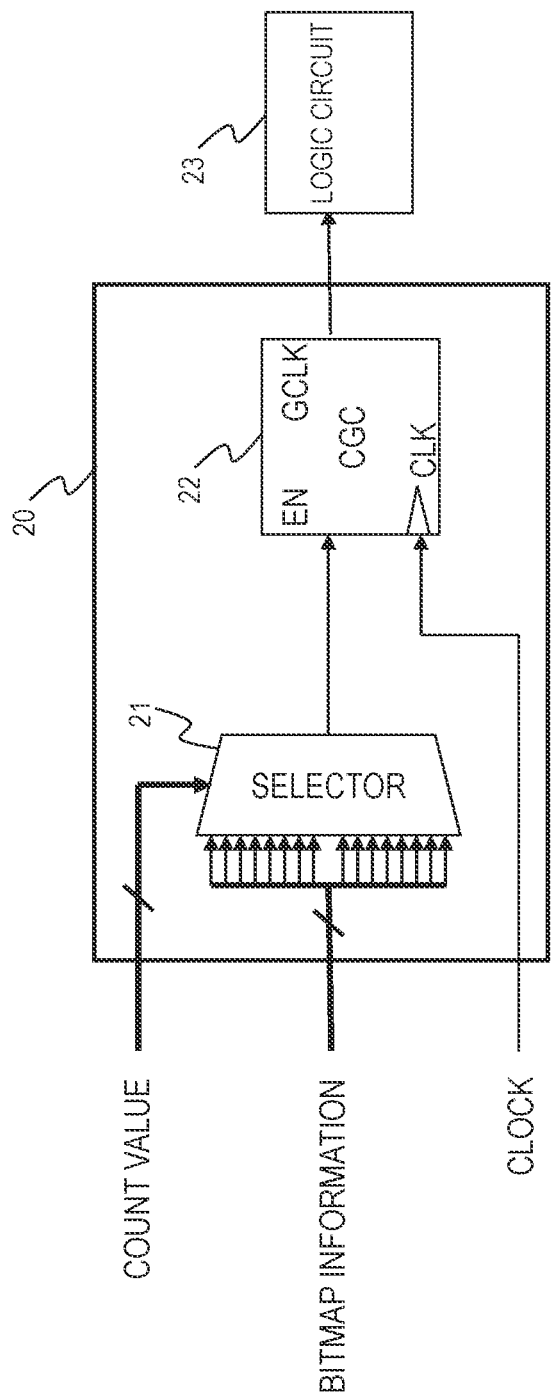
FIG. 2 is a block diagram showing a configuration of a clock control circuit according to the first embodiment.

FIG. 2 shows a detailed configuration of a clock control circuit (12A, 12B of FIG. 1) in the first embodiment.

In FIG. 2, the selector (21) selects the value of the bit position indicated by the count value from the bitmap information of 16 bits, for example, and outputs it as a clock enable signal. The clock gate cell (22) outputs an intermittent clock only when the clock enable signal indicates "1". The value range of the count value, the bit number of the bitmap information, the random number of the random number generators 1, 2 (14A, 14B) of FIG. 1 can be expanded to any number as required.

Figure 3:
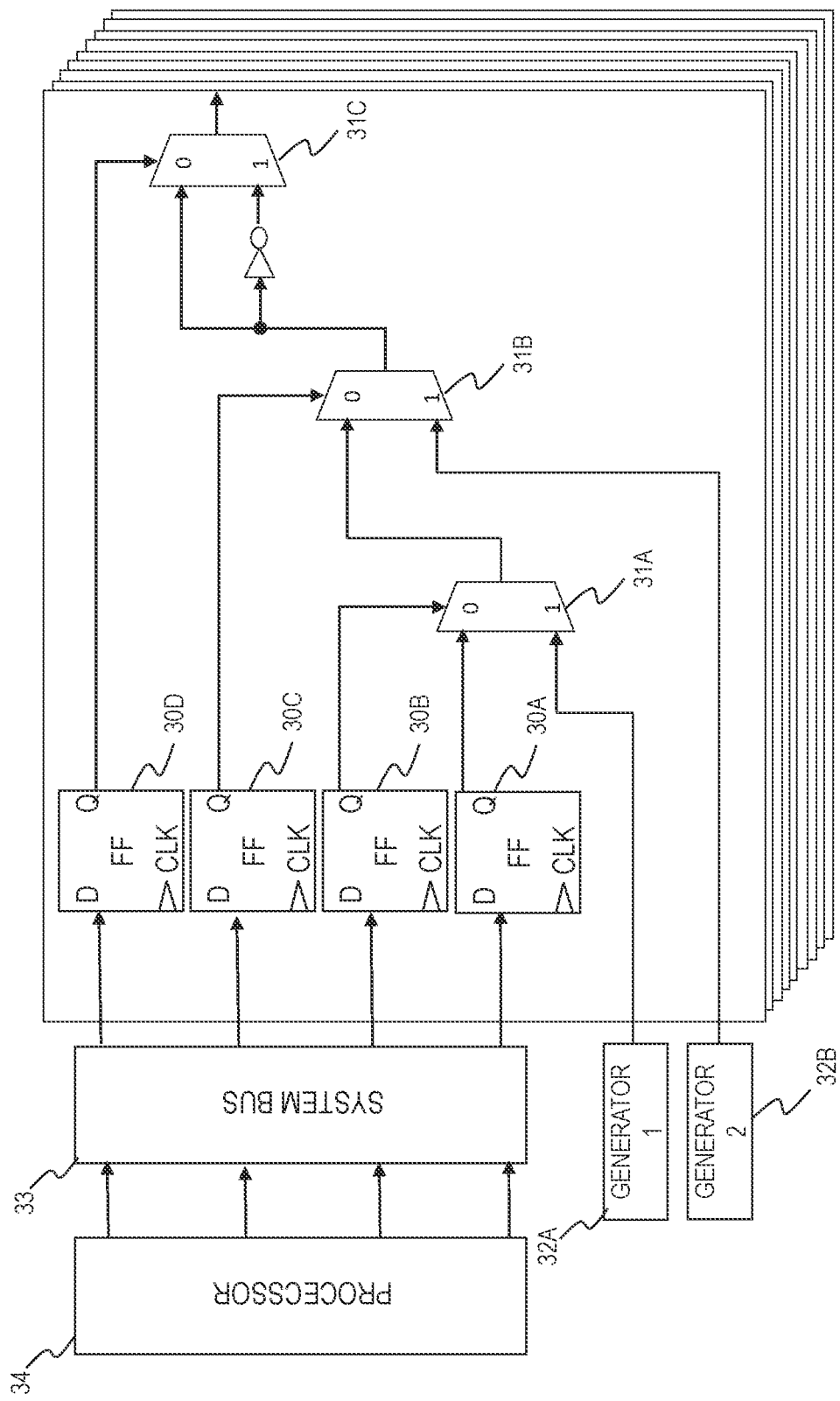
FIG. 3 is a block diagram showing a configuration of a bitmap circuit according to the first embodiment.

FIG. 3 shows a detailed configuration of a bitmap circuit in the first embodiment.

In FIG. 3, the bitmap 1 (30A) stores the oscillation control information 1 (basic oscillation pattern) set by the processor (34) via the system bus (33). The bitmap 2 (30B) stores the oscillation control information 2 set by the processor (34) via the system bus (33). The oscillation control information 2 is the information for selecting whether to replace the oscillation information to the random number value generated by the random number generator 1 (32A). The bitmap 3 (30C) stores the oscillation control information 3 set by the processor (34) via the system bus (33), The oscillation control information 3 is the information for selecting whether to replace the oscillation information to the random number value generated by the random number generator 2 (32B).

The bitmap 4 (30D) stores the oscillation control information 4 to be set by the processor (34) via the system bus (33). The oscillation control information 4 is the information for selecting whether to invert the oscillation state. The oscillation control information 1 to 4 set by the processor (34) is stored in the shared memory (17) of FIG. 1 in advance. The processor (34) reads the oscillation control information 1 to 4 via the system bus (33) and stores them in the bitmaps 1 to 4 (30A to 30D) of FIG. 3 via the system bus (33).

The selector 1 (31A) selects the value of the bitmap 1 (30A) or the random number generator 1 (32A) based on the value set in the bitmap 2 (30B). The selector 2 (31B) selects the value selected by the selector 1 (31A) or the value of the random number generator 2 (32B) based on the value set in the bitmap 3 (30C). The selector 3 (31C) selects the value selected by the selector 2 (31B) or the inverted value based on the value set in the bitmap 4 (30D). The bitmaps 1 to 4 (30A to 30D) and selectors 1 to 3 (31A to 31C) are implemented by counting value outputted by the counter circuit (11) of FIG. 1, respectively.

Next, the logic circuit A (10A) and the logic circuit B (10B) of FIG. 1 are complementarily operated to make it difficult to decrypt the encryption key by analyzing the current waveform.

For example, in the bitmap circuit A (15A) of FIG. 1, "0x5555" is set to the bitmap 1 (30A) of FIG. 3, and "0xFFFF (hexadecimal notation)" is set to the bitmap 2 (30B), the bitmap 3 (30C), and the bitmap 4 (30C) respectively. in the bitmap circuit B (15B) of FIG. 1, "0x5555" is set to the bitmap 1 (30A) of FIG. 3, and "15B (hexadecimal notation)" is set to the bitmap 2 (30B) and the bitmap 3 (30C), respectively. As a result, the bitmap information A (15A) of FIG. 1 outputted by the bitmap circuit A (15A) is "0x555" and the bitmap information B outputted by the bitmap circuit B (15B) of FIG. 1 is "0xAAAA".

Figure 4:
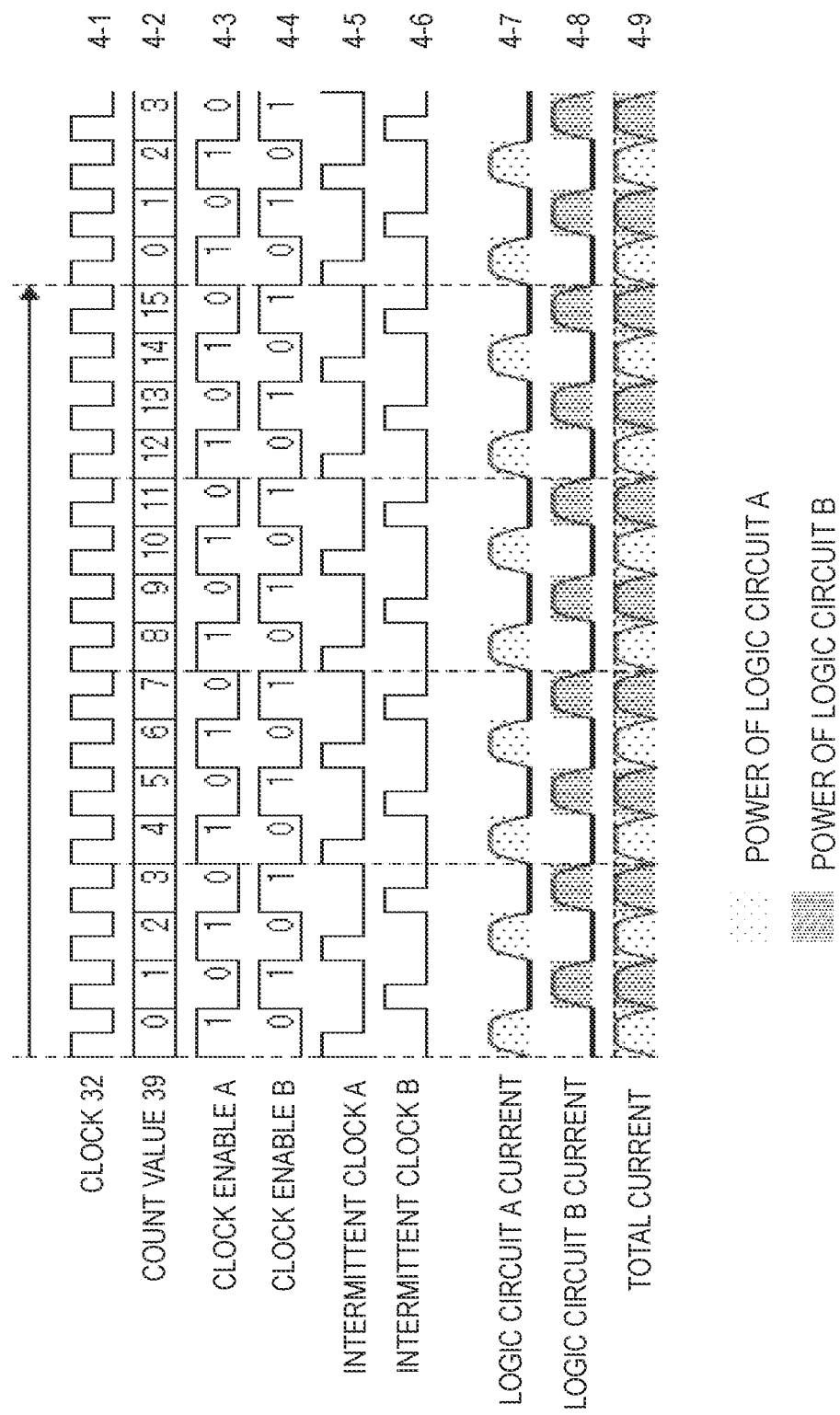
FIG. 4 is a diagram showing a time change of the current according to the first embodiment.

FIG. 4 is a diagram showing a time change of the intermittent clock and power in the first embodiment.

The count value outputted by the counter circuit (11) of FIG. 1 repeats the operation of sequentially incrementing from 0 to 15 (4-2). The selector (21) of FIG. 2 selects the value of the bit position indicated by the count value from the bitmap information ("0x5555" in the example of FIG. 4) and outputs it as a clock enable signal A (4-3). The selector (21) of FIG. 2 selects the value of the bit position indicated by the count value from the bitmap information ("0xAAAA" in the example of FIG. 4) and outputs it as a clock enable signal B (4-4). The intermittent clock A is outputted only when the value of the clock enable signal A is "1" (4-5). The intermittent clock B is outputted only when the value of the clock enable signal B is "1" (4-6). When the intermittent clock A is outputted, the switching current of the transistor flows inside the logic circuit A (10A) (4-7). When the intermittent clock B is outputted, the switching current of the transistor flows inside the logic circuit B (10B) (4-8). The sum current of the logic circuit A (10A) and the logic circuit B (10B) is as shown in 4-9 of FIG. 4.

As described above, as shown in FIG. 4, while the logic circuit A (10A) does not operate, the logic circuit B (10B) having a circuit size substantially equal to the logic circuit A (10A) is operated. Thus, the change in the consumed current in conjunction with the operation status of the logic circuit A (10A) is shielded, thereby making it difficult to decrypt the encryption key of the logic circuit A (10A) by analyzing the current waveform. These controls are realized by decimating the clock oscillator, as compared with the method of randomizing the clock oscillation described in Patent Document 1 (FIG. 34), less influence on the timing design.

Second Embodiment

In the side-channel attack avoidance method according to the first embodiment, while the logic circuit A that performs the processing of the encryption does not operate, the logic circuit B (which performs processing other than the encryption) having a circuit scale substantially equal to that of the logic circuit A is operated. Thus, the change in the current consumption linked to the operating state of the logic circuit A is shielded, it has become difficult to decrypt the encryption key of the logic circuit A by analyzing the current waveform, etc. On the other hand, in the side-channel attack avoidance method according to the present embodiment, in addition to the first embodiment, the logic circuit C unrelated to the logic circuit A is operated at random. This makes it even more difficult to decrypt the encryption key of the logic circuit A by analyzing the current waveform. The logic circuit A and the logic circuit B in the first embodiment are circuits of the same scale. The logic circuit C may be of any size.

Figure 5:
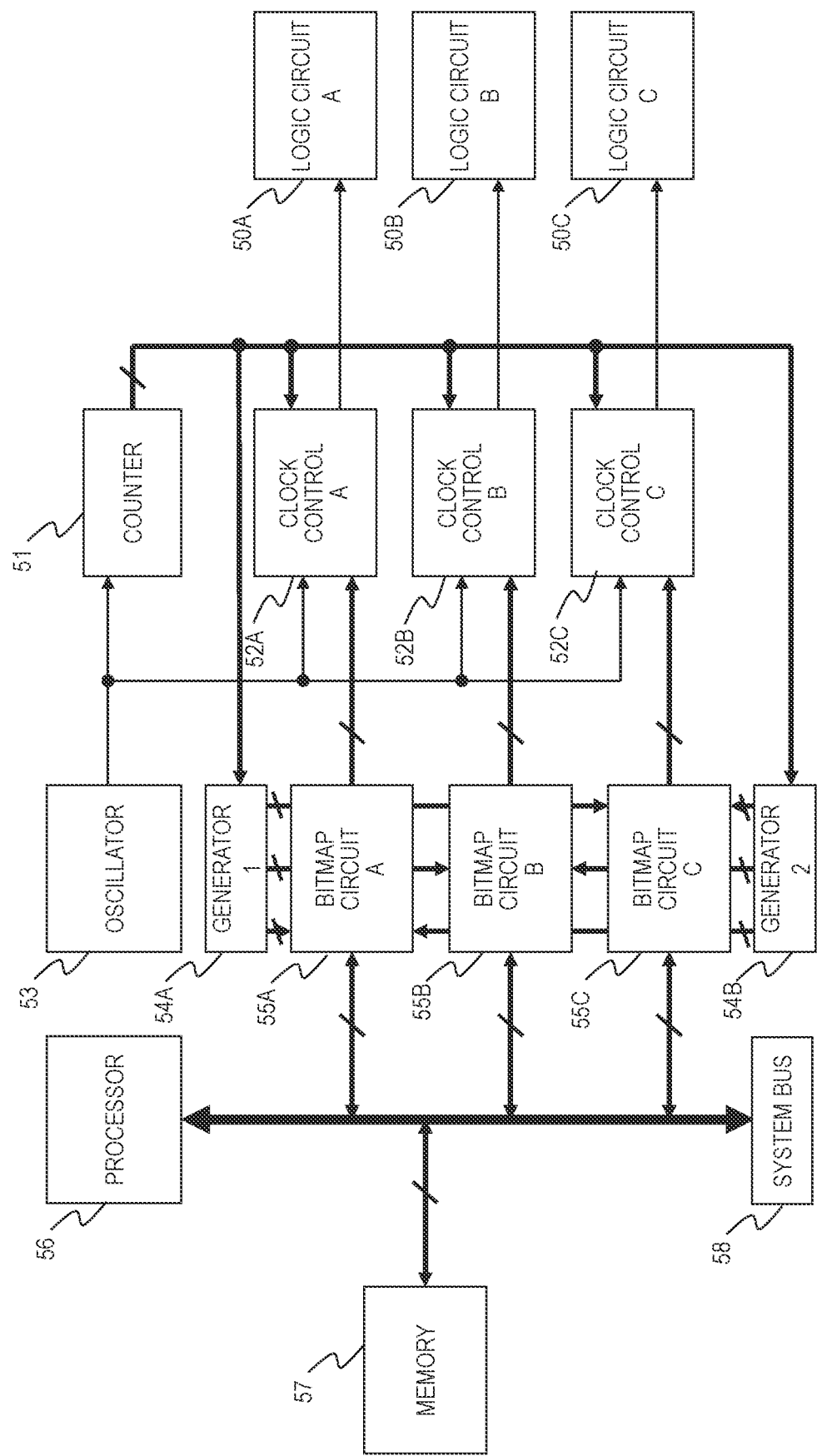
FIG. 5 is a configuration diagram of a semiconductor device according to a second embodiment and a third embodiment.

FIG. 5 is a diagram showing an overall configuration of a semiconductor device according to the second embodiment. Compared to the first embodiment, the logic circuit C, the clock control circuit C and the bitmap circuit C are added in this embodiment.

The bitmap information A, B outputted by the bitmap circuits A and B (55A, 55B) are the same as in the first embodiment. That is, in the bitmap circuit A (55A), "0x5555" is set in the bitmap 1 (30A) of FIG. 3, and "0x0000 (hexadecimal notation)" is set in the bitmap 2 (30B), the bitmap 3 (30C), and the bitmap 4 (30D), respectively. "0x5555" is set in the bitmap circuit B (55B) and "0xFFFF (hexadecimal notation)" is set in the bitmap 2 (30B), the bitmap 3 (30C) and the bitmap 4 (30D) respectively. As a result of setting, the bitmap information A outputted by the bitmap circuit A (55A) is "0x5555" and the bitmap information B outputted by the bitmap circuit B (55B) is "0xAAAA".

In the second embodiment, in addition to above, in the bitmap circuit C (55C), "0x0000" is set in the bitmap 1 (30A) of FIG. 3, "0xFFFF" is set in the bitmap 2 (30B) and "0x0000" is set in the bitmap 3 (30C) and the bitmap 4 (30D) respectively. As a result of setting, the bitmap information C outputted by the bitmap circuit C (55C) is a random number indicated by the random number generator 1 (54A). When the count value outputted by the counter circuit (51) overflows, the random number value of the random number generator 1 (54A) is updated to a new random number value, the new random number value is reflected in the bitmap information C.

Figure 6:
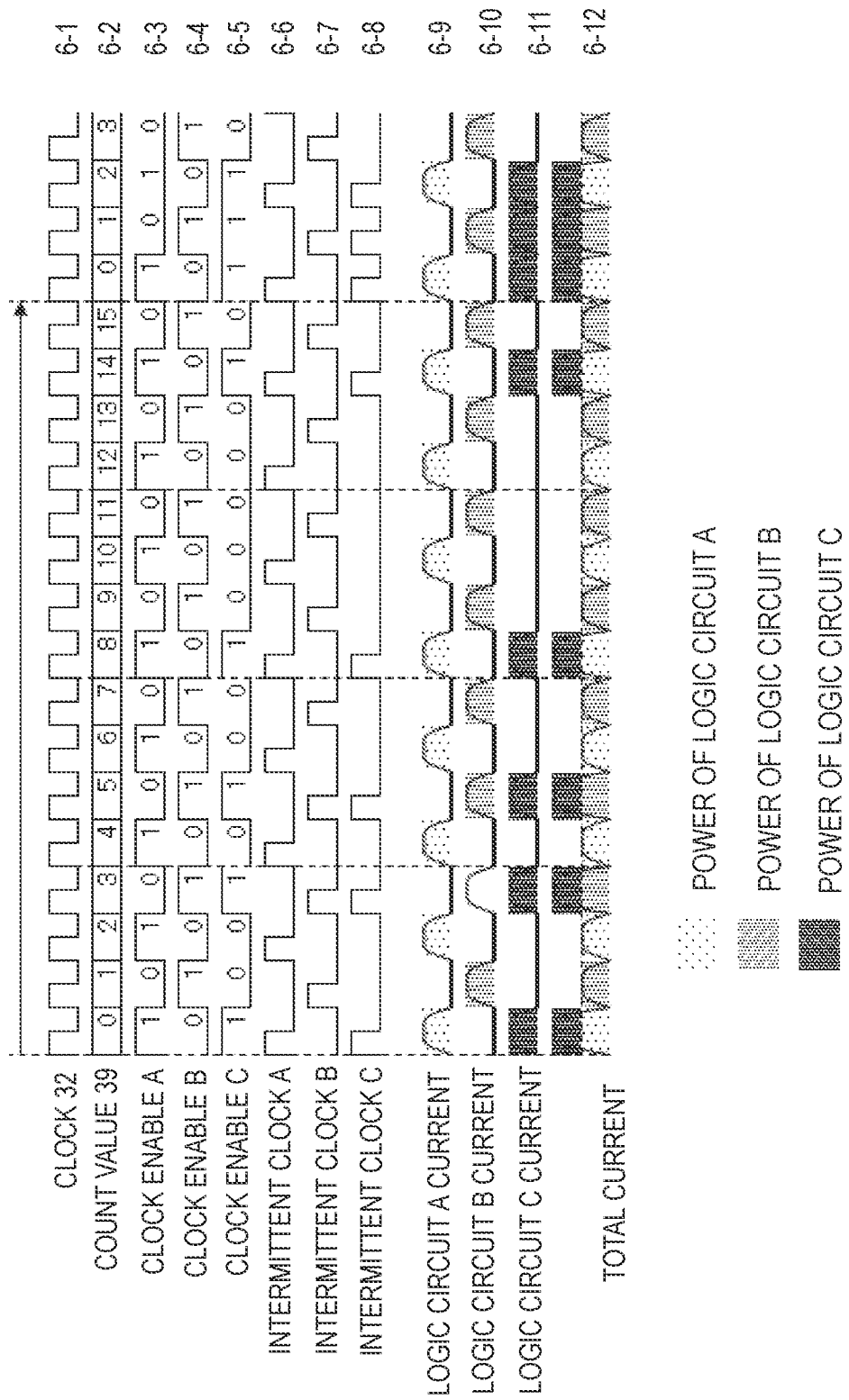
FIG. 6 is a diagram showing a time change of the current according to the second embodiment.

FIG. 6 is a diagram showing a time change of the intermittent clock and power in the second embodiment.

In the example shown in FIG. 6, in the 16 clock cycles, in the logic circuit A, B, the period (1) is a fixed oscillation control period, whereas, in the logic circuit C, the period (2) is a random oscillation control period by the random number generator 1 (54A). The count value outputted by the counter circuit (51) repeats the operation of sequentially incrementing from 0 to 15 (6-2). The clock enable signal A is outputted by selecting the value of the bit position specified by the count value from the bit map information ("0x5555" in the example of FIG. 6) (6-3). The clock enable signal B is outputted by selecting the value of the bit position specified by the count value from the bit map information ("0xAAAA" in the example of FIG. 6) (6-4). The clock enable signal C is outputted by selecting the value of the bit position specified by the count value from the bit map information ("0x4129" in the example of FIG. 6 at the beginning) (6-5).

The intermittent clock A oscillates only when the value of the clock enable signal A is "1" (6-6). The intermittent clock B oscillates only when the value of the clock enable signal B is "1" (6-7). The intermittent clock C oscillates only when the value of the clock enable signal C is "1" (6-8). When the intermittent clock A oscillates, the switching current of the transistor flows inside the logic circuit A (50A) (6-9). When the intermittent clock B oscillates, the switching current of the transistor flows inside the logic circuit B (50B) (6-10). When the intermittent clock C oscillates, the switching current of the transistor flows inside the logic circuit C (50C) (6-11). The sum current of logic circuits A, B, C (50A to 50C) is as shown in 6-12 of FIG. 6.

As shown in FIG. 6, while the logic circuit A (50A) does not operate, the logic circuit B (50B) having a circuit size approximately equal to that of the logic circuit A (50A) is operated. Thus, the change in the current consumption in conjunction with the operation status of the logic circuit A (50A) is shielded. In addition, the logic circuit C (50C) independent of the logic circuit A (50A) is randomly operated. Thus, it is possible to further make the decryption or the like of the encryption key of the logic circuit A (50A) by the analysis of the current waveform more difficult than the first embodiment.

In this embodiment, it is assumed that the logic circuit C (50C) is a circuit mounted in a semiconductor device. In Patent Document 1, it is required to add a circuit for false current generation. According to this embodiment, without using any additional circuit, i.e. without increasing the total power consumption and chip area, it is possible to obtain the same effect as Patent Document 1.

Third Embodiment

In addition to the second embodiment, using the random number generator 2 (54B) of FIG. 5, illustrating an example of realizing the same effect as the clock randomization and dummy process insertion described in Patent Document 1.

For example, in the bitmap circuit A (55A) of FIG. 5, "0x5555" is set in the bitmap 1 (30A) of FIG. 3, "0x0000" is set in the bitmap 2 (30B), "0xFF00" is set in the bitmap 3 (30C), and "0x0000 (hexadecimal notation)" is set in the bitmap 4 (30D).

In the bitmap circuit B (55B), "0x5555" is set in the bitmap 1 (30A) of FIG. 3, "0x0000" is set in the bitmap 2 (30B), "0xFF00" is set in the bitmap 3 (30C), and "0xFFFF (hexadecimal notation)" is set in the bitmap 4 (30D).

The upper 8 bits of the bitmap information A outputted by the bitmap circuit A (55A) are random numbers indicated by the random number generator 2 (54B), and the lower 8 bits are "0x55". The upper 8 bits of the bitmap information B outputted by the bitmap circuit B (55B) are inverted values of random numbers indicated by the random number generator 2 (54B), and the lower 8 bits are "0xAA".

When the count value outputted by the counter circuit (51) overflows, the random number value of the random number generator 2 (54B) is updated to a new random number value. The new random number value is reflected in the upper 8 bits of the bitmap information A outputted by the bitmap circuit A (55A). The new random number is reflected in the upper 8 bits of the bitmap information B outputted by the bitmap circuit B (55B). The random number value of the random number generator 2 (54B) shall be "0x1E37" at the beginning, for example, and the new value shall be "0x39EA".

On the other hand, in the bitmap circuit C (55C), the bitmap information C output by the bitmap circuit C (55C) becomes a random number value indicated by the random number generator 1 (54A) when "0x0000" is set in the bitmap 1 (30A) in FIG. 3, "0xFFFF" is set in the bitmap 2 (30B), and "0x0000 (hexadecimal notation)" is set in the bitmap 3 (30C) and the bitmap 4 (30D), respectively. When the count value outputted by the counter circuit (51) overflows, the random number value of the random number generator 1 (54A) is updated to a new random number value, a new random number value is reflected in the bitmap information C outputted by the bitmap circuit C (55C). The random number value of the random number generator 1 (54A) is, for example, initially "0x4129", the new value is "0xC5A7".

Figure 7:
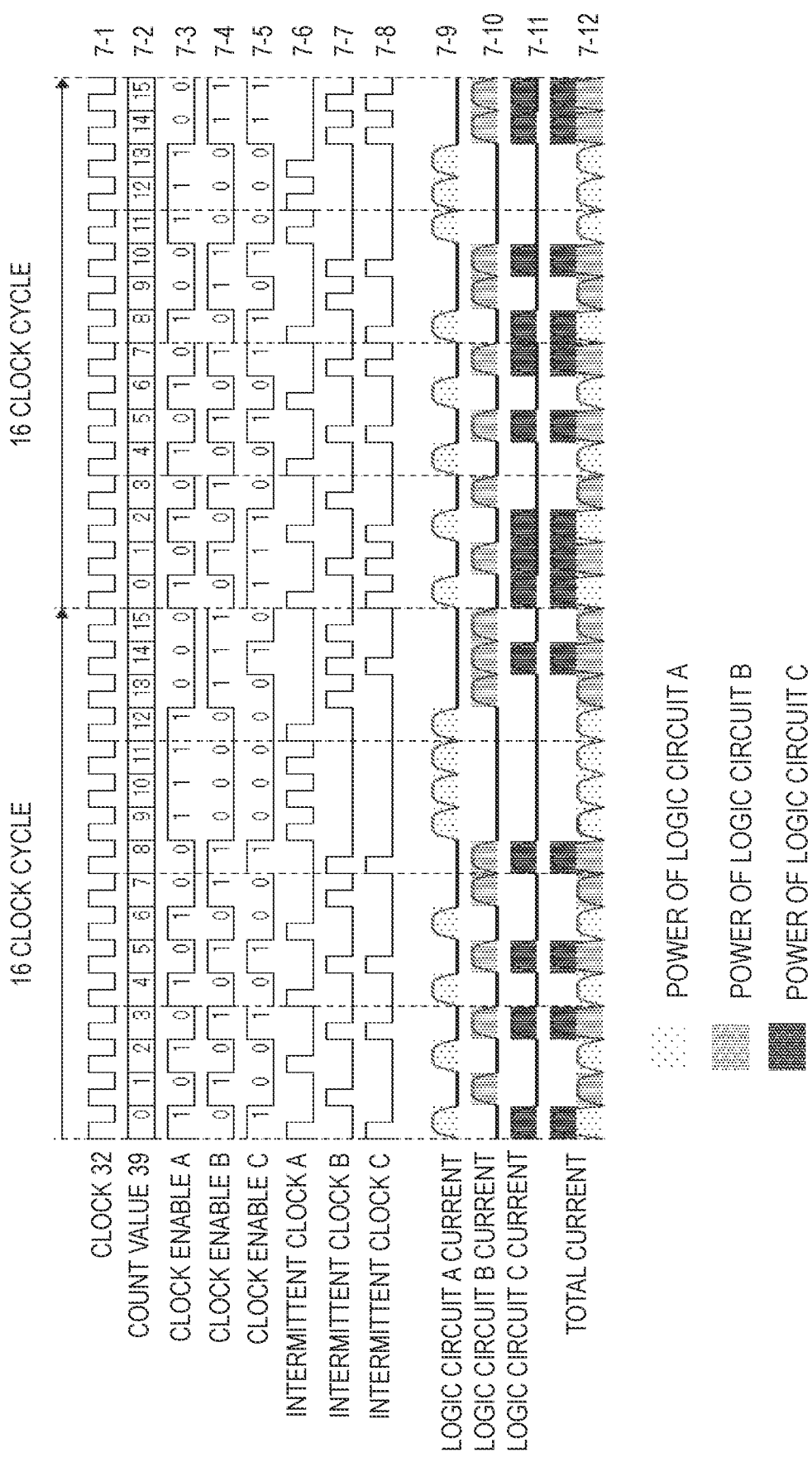
FIG. 7 is a diagram showing a time change of the current according to the third embodiment

The time change of the intermittent clock and power in the third embodiment shown in FIG. 7.

In the example shown in FIG. 7, in the 16 clock cycles, the logic circuit A and B, the period (1) is a fixed oscillation control period, the period (3) is a random oscillation control period by the random number generator 2 (54B). On the other hand, in the logic circuit C, the period (2) is a random oscillation control period by the random number generator 1 (54A).

As shown in FIG. 7, while the logic circuit A (50A) does not operate, the logic circuit B (50B) having a circuit size almost equal to that of the logic circuit A (50A) is operated. After shielding the change in the current consumption linked to the operation status of the logic circuit A (50A), the logic circuit C (50C) unrelated to the logic circuit A (50A) is randomly operated. Then, randomly insert a dummy period during which the logic circuitry A (50A) does not operate. Thus, the decryption of the encryption key of the logic circuit A (50A) by the analysis of the current waveform can be made more difficult than the second embodiment.

In this embodiment, it is assumed to use a technique known clock gating clock random. As in the technique of placing jitter on the clock described in Patent Document 1, it is not required to consider the deviation from the median of the frequency. Therefore, in the timing design, there is no need to increase the margin of jitter, without increasing the difficulty of the timing design, it is possible to obtain the same effect as the clock randomization described in Patent Document 1.

First Modification

In the third embodiment, by changing the setting values of the bitmap 1 (30A) and the bitmap 2 (30B) in FIG. 3, it is possible to control the operation rates of the logic circuit A (10A) in FIG. 1 and the logic circuit A (50A) in FIG. 5.

When the ratio of the fixed oscillation control period set by the bitmap 1 (30A) of FIG. 3 in the example of FIG. 7 is 50%, the ratio of the random oscillation control period set by the bitmap 3 (30C) of FIG. 3 is 50%, the random number generator 2 (14B of FIG. 1, 54B of FIG. 5) if the generation ratio of 0/1 is, for example, 50%, the average operation ratio of the logic circuit A (10A of FIG. 1, 50A of FIG. 5) is 50%. If you want to increase the average operation rate of the logic circuit A, it is sufficient to increase the ratio of the fixed oscillation period set by the bitmap 1 (30A) of FIG. 3.

Second Modification

In the third embodiment, to insert the dummy processing period of the logic circuit A (10A of FIG. 1, 50A of FIG. 5), the random number generator 1 (14A of FIG. 1, 54A of FIG. 5) can also be used in conjunction. By using two different random number generating source, it is possible to insert the dummy processing period to the logic circuit A (10A of FIG. 1, 50A of FIG. 5). This means that similar effects can be achieved by replacing the random number generator 1 (14A of FIG. 1, 54A of FIG. 5) and the random number generator 2 (14B of FIG. 1 and 54B of FIG. 5) with circuits such as pseudo-random number generators that are easier to implement and operate with different generation algorithms.

Third Modification

In the third embodiment, by periodically changing the settings of the bitmaps 1 to 4 (30A to 30D) in FIG. 3, it is also possible to further change the current consumption when viewed in the time-axis and make it difficult to decrypt the encryption key by analyzing the current waveform.

Fourth Modification

In the third embodiment, for simplicity of operation explanation, the fixed oscillation control period to be set in the bitmap 1 (30A) of FIG. 3 and the random oscillation control period to be set in the bitmap 3 (30C) of FIG. 3 are set to alternate every 8 cycles. And by changing the setting of the bitmap, the fixed oscillation control period and the random oscillation control period can also be set to alternate in different cycles. For example, when the bitmap 1 (30A) of FIG. 3 is set to "0x8888" and the bitmap 3 (30C) of FIG. 3 is set to "0x5555", random oscillation, stopping, random oscillation, and oscillation are repeated, and random oscillation is performed in a shorter period. It is possible to make it more difficult to decrypt the encryption key by analyzing the current waveform.

It should be noted that the present invention is not limited to the above-mentioned embodiments, and various modifications can be made without departing from the gist thereof.

What is claimed is:
1. A semiconductor device comprising:
    a counter circuit for outputting a count value in accordance with a reference clock,
    a first random number generator for generating a first random number value in accordance with the count value,
    a second random number generator for generating a second random number value in accordance with the count value, a first bitmap circuit for outputting a first bitmap information in accordance with a plurality of bitmaps, the first random number value and the second random number value, a first clock control circuit for outputting a first intermittent clock in accordance with a combination of the reference clock, the count value and the first bitmap information, a second bitmap circuit for outputting a second bitmap information in accordance with the plurality of bitmaps, the first random number value and the second random number value, a second clock control circuit for outputting a second intermittent clock in accordance with a combination of the reference clock, the count value and the second bitmap information; and wherein the semiconductor resists side-channel attacks by the first and second clock control circuits being configured to respectively output the first and second intermittent clocks in a manner that avoids the side-channel attacks.

2. The semiconductor device according to claim 1, wherein the first clock control circuit has a first selector and a first clock output circuit, and wherein the first selector outputs a first clock enable signal in accordance with the count value and the first bitmap information, and the first clock output circuit outputs the first intermittent clock in accordance with the first clock enable signal.

3. The semiconductor device according to claim 1, wherein the second clock control circuit has a second selector and a second clock output circuit, and wherein the second selector outputs a second clock enable signal in accordance with the count value and the second bitmap information, and the second clock output circuit outputs the second intermittent clock in accordance with the second clock enable signal.

4. The semiconductor device according to claim 1, wherein the plurality of bitmaps includes a first bitmap indicating a basic oscillator information, a second bit map indicating whether to replace the basic oscillator information with the first random number value, a third bit map indicating whether to replace the basic oscillator information with the second random number value, and a fourth bit map indicating whether or not to invert the basic oscillator information, and wherein the first bitmap circuit and the second bitmap circuit output the first bitmap information and the second bitmap information by a combination of the first bitmap, the second bitmap, the third bitmap, and the fourth bitmap, respectively.

5. The semiconductor device according to claim 4, wherein the first bitmap circuit and the second bitmap circuit output one of a first oscillation information, a second oscillation information and a third oscillation information as the first bitmap information and the second bitmap information, respectively, and wherein the first oscillation information is generated by selecting one of the first bitmap and the first random value based on the second bitmap, the second oscillation information is generated by selecting one of the first oscillation information and the second random value based on the third bitmap, and the third oscillation information is generated by selecting either the second oscillation information or an inverted value of the second oscillation information.

6. The semiconductor device according to claim 1 further comprising:

a third bitmap circuit for outputting a third bitmap information according to the plurality of bitmaps and the first random number value and the second random number value, and a third clock control circuit for outputting a third intermittent clock in accordance with a combination of the reference clock, the count value and the third bitmap information.

7. The semiconductor device according to claim 6, wherein the third bitmap information is the first random number value.

8. The semiconductor device according to claim 7, wherein the first bitmap information is the second random number, and the second bitmap information is an inverted value of the second random number.

9. The semiconductor device according to claim 1, wherein the first random number generator and the second random number generator generate the first random number value and the second random number value, respectively, using different algorithms.

10. The semiconductor device according to claim 4, wherein the first bitmap, the second bitmap, the third bitmap, and the fourth bitmap are periodically modified by a processor.

11. A method for controlling clock in a semiconductor device, the method comprising:

outputting a count value in accordance with a reference clock;

generating a first random number value in accordance with the count value;

generating a second random number value in accordance with the count value;

outputting a first bitmap information in accordance with a plurality of bitmaps, the first random number value and the second random number value;

outputting a first intermittent clock in accordance with a combination of the reference clock, the count value and the first bitmap information;

outputting a second bitmap information in accordance with the plurality of bitmaps, the first random number value and the second random number;

outputting a second intermittent clock in accordance with a combination of the reference clock, the count value and the second bitmap information; and wherein the semiconductor resists side-channel attacks by outputting the first and second intermittent clocks in a manner that avoids the side-channel attacks.

12. A method for controlling clock in a semiconductor device, the method comprising:

outputting a count value incremented in accordance with a reference clock;

generating a first random number value in accordance with the count value;

generating a second random number value in accordance with the count value;

outputting a first bitmap information according to a plurality of bitmaps and the first random number value and the second random number;

outputting a first intermittent clock in accordance with a combination of the reference clock, the count value and the first bitmap information;

outputting a second bitmap information in accordance with a plurality of bitmaps, the first random number value and the second random number;

outputting a second intermittent clock in accordance with a combination of the reference clock, the count value and the second bitmap information;

outputting a third bitmap information in accordance with the plurality of bitmaps and the first random number value and the second random number value;

outputting a third intermittent clock in accordance with a combination of the reference clock, the count value, and the third bit map information; and wherein the semiconductor resists side-channel attacks by respectively outputting the first, second, and third intermittent clocks in a manner that avoids the side-channel attacks.

\* \* \* \* \*